US012390910B2

(12) United States Patent
Chen et al.

(10) Patent No.: US 12,390,910 B2
(45) Date of Patent: Aug. 19, 2025

(54) DRIVING MECHANISM

(71) Applicant: PORITE TAIWAN CO., LTD., Miaoli County (TW)

(72) Inventors: Yao-Han Chen, Miaoli County (TW); Chin-Chiang Chen, Miaoli County (TW)

(73) Assignee: PORITE TAIWAN CO., LTD., Miaoli County (TW)

( * ) Notice: Subject to any disclaimer, the term of this patent is extended or adjusted under 35 U.S.C. 154(b) by 0 days.

(21) Appl. No.: 18/882,764

(22) Filed: Sep. 12, 2024

(65) Prior Publication Data

US 2025/0001562 A1 Jan. 2, 2025

Related U.S. Application Data

(62) Division of application No. 18/164,617, filed on Feb. 6, 2023, now Pat. No. 12,115,627.

(30) Foreign Application Priority Data

Dec. 12, 2022 (TW) ................................ 111147611

(51) Int. Cl.
*B25B 21/02* (2006.01)
*B25F 5/00* (2006.01)

(52) U.S. Cl.
CPC ............ *B25B 21/023* (2013.01); *B25B 21/02* (2013.01); *B25F 5/001* (2013.01)

(58) Field of Classification Search
CPC ....... B25B 19/00; B25B 21/02; B25B 21/023; B25B 21/026; B25B 23/00; B25B 23/14; B25B 23/1453; B25D 11/00; B25F 5/001
USPC ........ 173/93, 93.5, 93.6, 178, 104, 114, 217
See application file for complete search history.

(56) References Cited

U.S. PATENT DOCUMENTS

| | | | | | |
|---|---|---|---|---|---|
| 3,228,486 | A * | 1/1966 | Kaman | B25B 21/02 | 192/69.62 |
| 3,789,934 | A * | 2/1974 | Schoeps | B25B 21/026 | 173/93.5 |
| 4,557,337 | A * | 12/1985 | Shibata | B25B 21/026 | 173/93.5 |
| 4,683,961 | A * | 8/1987 | Schoeps | B25B 23/1453 | 464/25 |
| 4,735,595 | A * | 4/1988 | Schoeps | B25B 21/026 | 464/25 |
| 4,767,379 | A * | 8/1988 | Schoeps | B25B 21/02 | 464/25 |
| 6,110,045 | A * | 8/2000 | Schoeps | B25B 21/02 | 464/25 |

(Continued)

*Primary Examiner* — Scott A Smith
(74) *Attorney, Agent, or Firm* — Idea Intellectual Limited; Sam T. Yip

(57) ABSTRACT

The present disclosure provides a driving mechanism, which includes a driving shaft, a sleeve, a plurality of guiding members, an impact bulk and an output shaft. The sleeve is sleeved on the driving shaft and has a plurality of guiding grooves for accommodating the guiding members. The impact bulk is sleeved on the outside of the sleeve. Some guiding members are linearly immovable relative to the driving shaft; other guiding members are linearly immovable relative to the impact bulk. With the design of the guiding grooves, the torque input into the driving shaft is transferred into an impact torque applied on the output shaft.

3 Claims, 7 Drawing Sheets

(56) References Cited

U.S. PATENT DOCUMENTS

| | | | | |
|---|---|---|---|---|
| 6,311,787 | B1 * | 11/2001 | Berry | B25F 5/001 192/223.2 |
| 6,497,316 | B1 * | 12/2002 | Hsu | B25B 21/004 192/223.2 |
| 6,983,808 | B1 * | 1/2006 | Chen | B25B 21/02 173/93.5 |
| 7,063,201 | B2 * | 6/2006 | Nakamura | B25F 5/001 192/223.1 |
| 7,438,140 | B2 * | 10/2008 | Sterling | B25B 21/02 173/104 |
| 7,455,574 | B2 * | 11/2008 | Chu | B25F 5/001 451/340 |
| 9,636,808 | B2 * | 5/2017 | Ho | B25B 21/02 |
| 12,115,627 | B2 * | 10/2024 | Chen | B25B 21/023 |
| 2002/0130007 | A1 * | 9/2002 | Nakamura | B25B 21/00 173/217 |
| 2009/0065229 | A1 * | 3/2009 | Uemura | B25B 23/1453 173/93.5 |
| 2015/0114674 | A1 * | 4/2015 | Ho | B25B 21/026 173/93.6 |

* cited by examiner

DRIVING MECHANISM

CROSS-REFERENCE TO RELATED APPLICATIONS

The present application is a divisional of the U.S. non-provisional patent application Ser. No. 18/164,617 filed Feb. 6, 2023, now U.S. Pat. No. 12,115,627, which claims the priority from the Taiwan patent application serial number 111147611 filed Dec. 12, 2022, and the disclosure of which is incorporated herein by reference in their entirety.

FIELD OF THE INVENTION

The present invention relates to a driving mechanism, particularly a driving mechanism applicable to an impact wrench.

BACKGROUND

Impact driver is a tool that provides high torque. A common impact driver has a driving shaft that can be driven, an impact bulk, an output shaft, balls and a resilient member. The driving shaft and the impact bulk both have guiding grooves. The impact bulk is sleeved on the driving shaft, and the ball is located in the guiding groove. The resilient member provides a tension between the driving shaft and the impact bulk. With the design of the shape of the guiding grooves of the driving shaft and the impact bulk, the movement of the ball in the guiding groove can make the rotating driving shaft cause the impact bulk to move in the axial direction and rotate at the same time. The surface of the impact bulk on which the output shaft abuts against has a plurality of protruding blocks, such that the rotating impact bulk will move backward automatically upon reaching a critical point and then the protruding blocks will abut against the output shaft. At that time, the resilient member is compressed and stores a greater tension. As the impact bulk continues rotating such that the surface on which the output shaft abuts against goes beyond the surface of the protruding block, the tension stored in the resilient member is exerted on the impact bulk instantaneously to provide it with a forward impulse. At that time, due to the limitation on the movement of the ball in the guiding groove, the impulse will be transferred to a torque applied to the impact bulk, which thereby causes the protruding block of the impact bulk to impact the output shaft in the circumferential direction so that the output shaft generates a instantaneous torque and achieve the objective of screwing in (tight) and out (loose) a screw.

However, forming the guiding grooves on the driving shaft and the impact bulk requires precise processing technique, which will increase not only processing time but also cost. In addition, since the guiding grooves are located on the driving shaft and the impact bulk, they each can only has one design for the shape the guiding groove and cannot easily change the shape of the guiding groove to meet different usage needs.

SUMMARY OF THE INVENTION

In some embodiments, the present disclosure provides a driving mechanism, which comprises a driving shaft, a sleeve, an impact bulk, a first guiding member and a second guiding member. The sleeve is sleeved on the driving shaft and has a first guiding groove and a second guiding groove. The impact bulk is sleeved on the sleeve. The first guiding member is movable in the first guiding groove and is configured to have no linear movement relative to the driving shaft. The second guiding member is movable in the second guiding groove and is configured to have no linear movement relative to the impact bulk. By means of the movement of the first guiding member in the first guiding groove and the movement of the second guiding member in the second guiding groove, the sleeve can move with respect to the driving shaft and the impact bulk in the axial direction.

In some embodiments, the present disclosure provides a driving mechanism, which comprises an input mechanism, a sleeve, an impact bulk and a resilient member. The sleeve is sleeved on the input mechanism. The impact bulk is sleeved on the sleeve. The resilient member is configured to apply a tension to the impact bulk relative to the input mechanism in the axial direction. By means of a force-torque transfer mechanism, the tension applied to the impact bulk is transferred to a torque applied to the output mechanism.

The above contents generally recite the technical features of the present disclosure so that the following detailed description of the present disclosure can be better understood. Other technical features constituting the subject matters of the claims of the present disclosure are recited in the following contents. A person with general knowledge in the field of the present disclosure can easily modify or design other structures or manufacturing processes by utilizing the concept or specific embodiment and thereby achieve the same objectives of the present disclosure. A person with general knowledge in the field of the present disclosure should understand an equivalent structure cannot escape the spirit and scope as defined in the claims.

BRIEF DESCRIPTION OF THE DRAWINGS

The configurations of the present disclosure can be better understood according to the following embodiments when reading the present disclosure with the accompanying drawings. It should be noted that the features may have been depicted without reflecting the proportions and the size of the features may have been enlarged or narrowed in order to clearly describe the contents of the present disclosure.

In the drawings and embodiments of the present disclosure, same or similar elements are denoted by same reference numeral.

DESCRIPTION OF THE EMBODIMENTS

Figure 1:
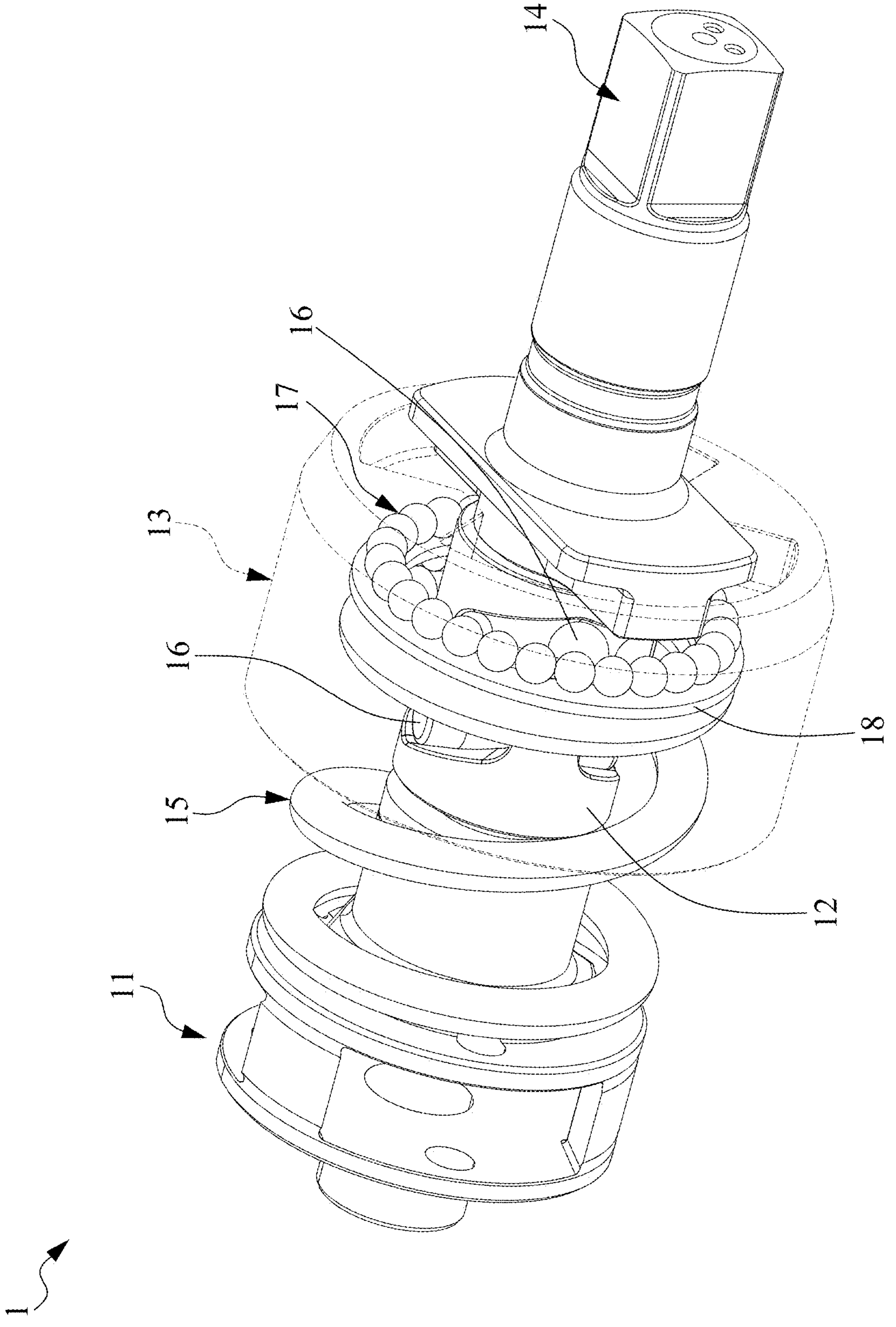
FIG. 1 is a perspective view depicting the driving mechanism of an embodiment of the present disclosure.
Figure 2:
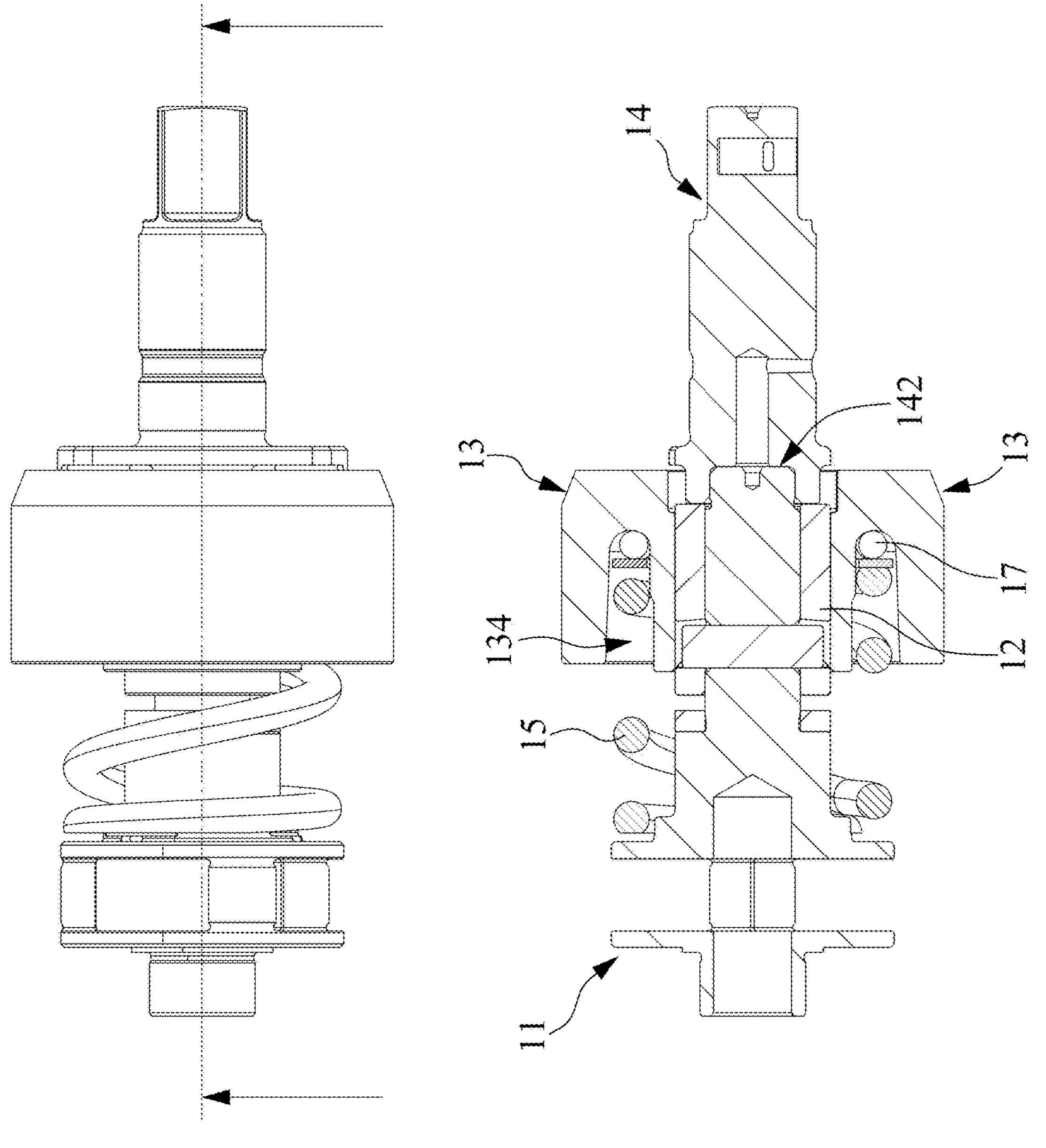
FIG. 2 depicts the side view and the cross-sectional view of the driving mechanism in FIG. 1.
Figure 3:
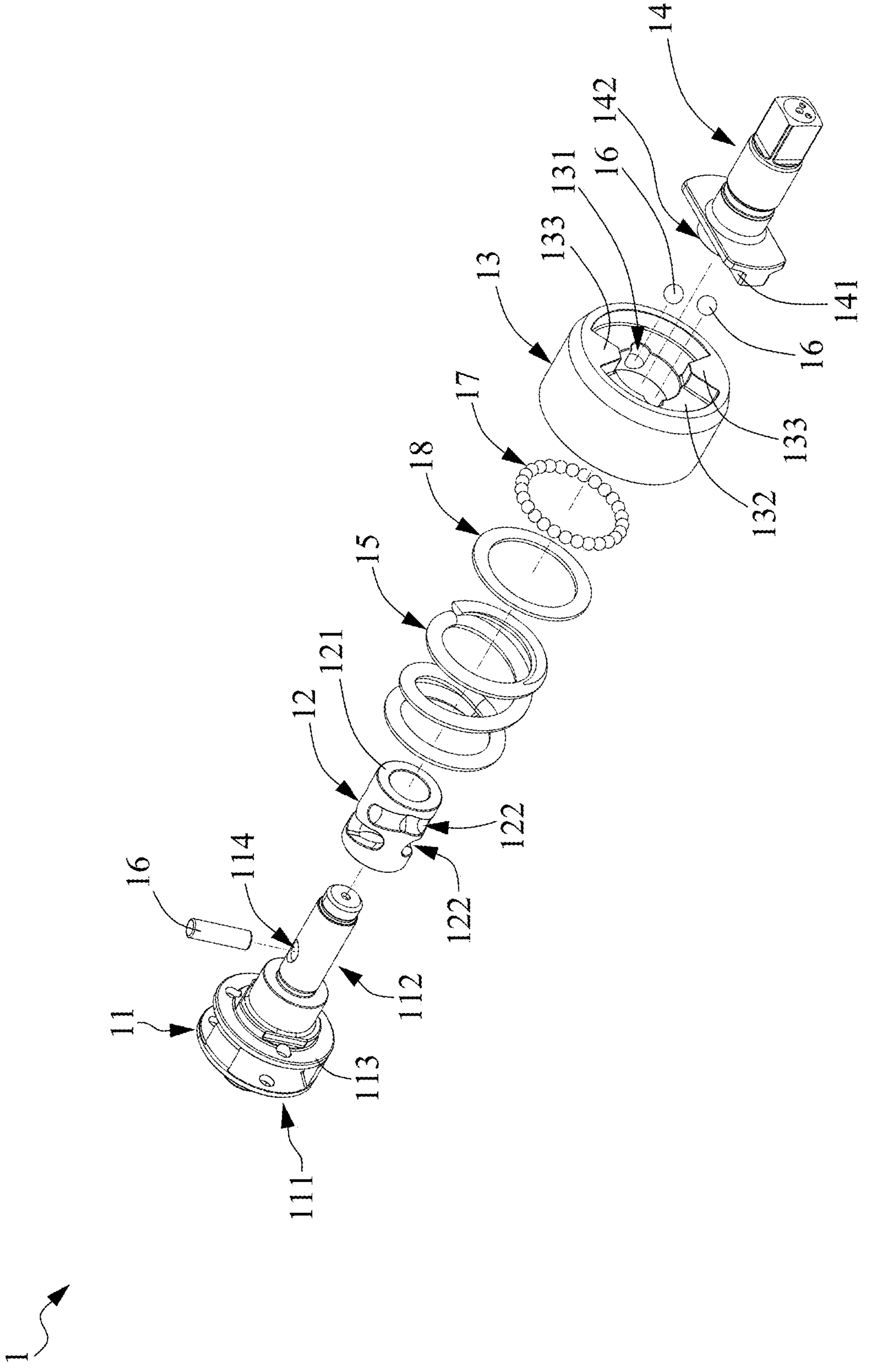
FIG. 3 is an exploded view depicting the driving mechanism in FIG. 1.

FIG. 1 depicts the perspective view of the driving mechanism 1 of an embodiment of the present disclosure; FIG. 2 depicts the side view and the cross-sectional view of the drive mechanism shown in FIG. 1; FIG. 3 depicts the exploded view of the driving mechanism shown in FIG. 1.

Figure 4:
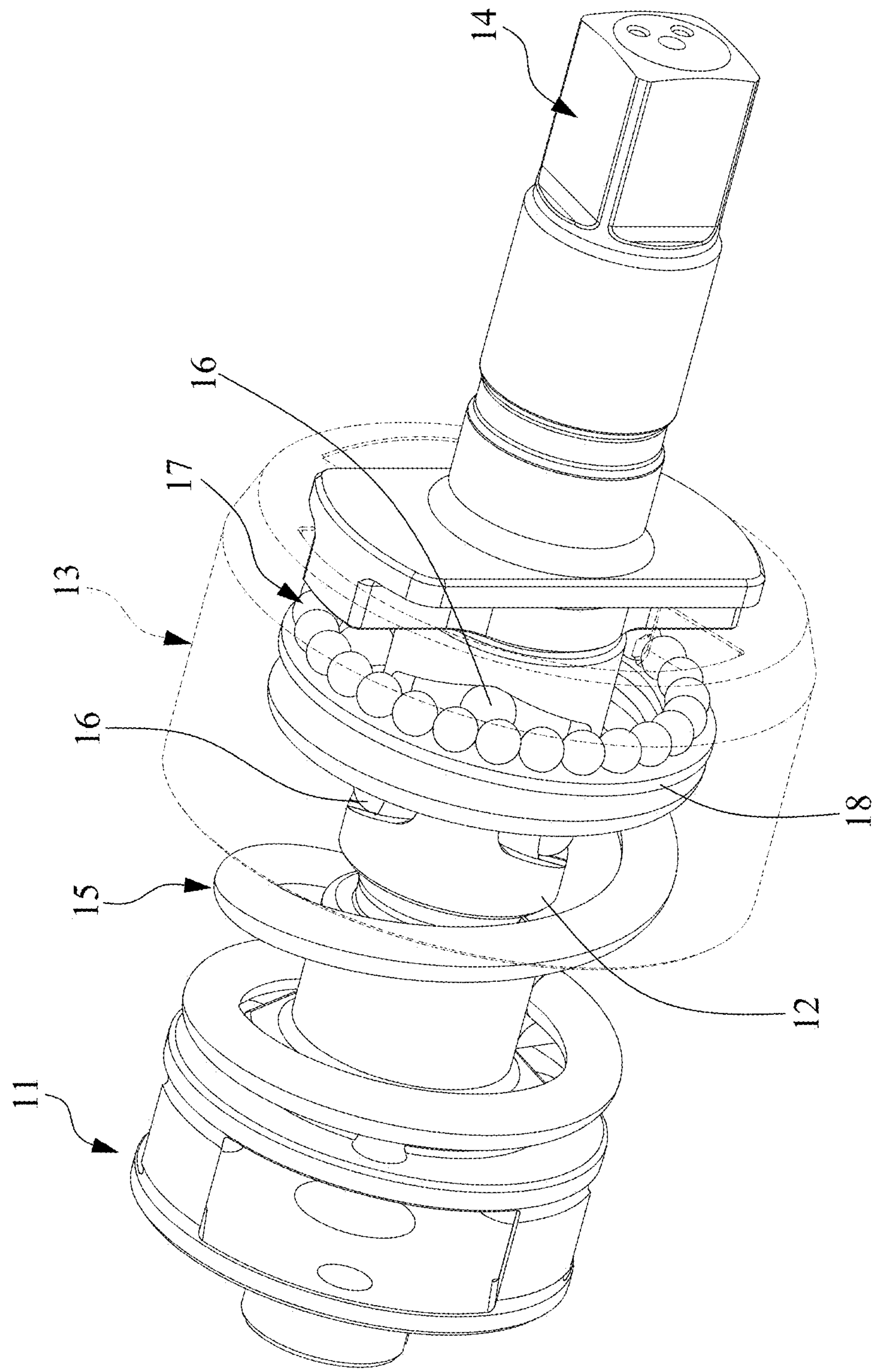
FIG. 4 is a perspective view depicting the driving mechanism of another embodiment of the present disclosure.
Figure 5:
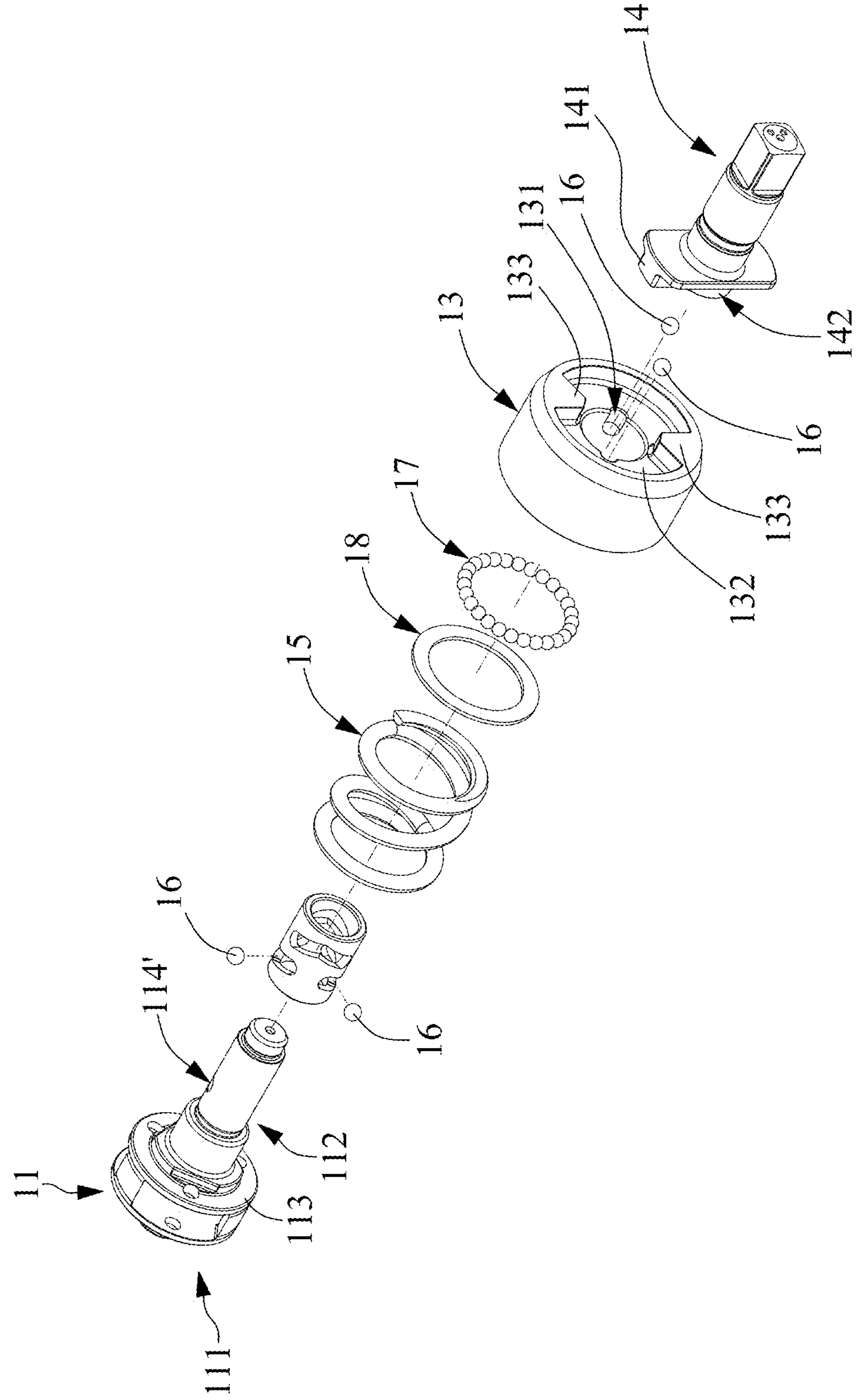
FIG. 5 is an exploded view depicting the driving mechanism in FIG. 1.

In some embodiments, FIG. 4 depicts the perspective view of the driving mechanism of another embodiment; FIG. 5 depicts the exploded view of the driving mechanism shown in FIG. 4.

In some embodiments, the driving mechanism 1 mainly comprises a driving shaft 11, a sleeve 12, an impact bulk 13 (depicted with broken lines in FIGS. 1 and 4), a resilient member 15, an output shaft 14, a plurality of guiding members 16, a rolling member 17 and an annular gasket 18.

In some embodiments, the driving mechanism 11 has a proximal end 111 close to the user and a distal end 112 far from the user. In some embodiments, the driving shaft 11 has an annular protruding portion 113 at the proximal end 111 thereof. In some embodiments, the sleeve 12 is sleeved on the driving shaft 11 from the distal end 112 of the driving shaft 11; the impact bulk 13 is sleeved on the outer peripheral wall of the sleeve 12. In some embodiments, the impact bulk 13 is roughly a hollow cylindrical body and has an annular groove 134 with an U-shaped cross-section; the annular gasket 18 and a plurality of rolling members 17 are accommodated in the annular groove 134. In some embodiments, the output shaft 14 is an output mechanism which has a notch at one end thereof, the notch can be sleeved on a portion of the distal end 112 of the driving shaft 11 and thereby abuts against the distal end 112 of the driving shaft 11. In some embodiments, the output shaft 14 abuts against the outer side wall 121 of the sleeve 12 in the longitudinal direction. In some embodiments, the resilient member 15 is sleeved on the driving shaft 11. In some embodiments, one end of the resilient member 15 abuts against the annular protruding portion 113 of the driving shaft 11 and the other end of the resilient member 15 abuts against the annular gasket 18 of the impact bulk 13. When the resilient member 15 is compressed, it applies a tension between the driving shaft 11 and the impact bulk 13.

As shown in FIG. 3, in some embodiments, the driving shaft 11 defines an axial direction and has a through hole 114 for the guiding member 16 to be disposed and penetrate therethrough, the through hole 114 penetrates the driving shaft 11 in the direction of the diameter of the driving shaft 11. In some embodiments, the guiding member 16 is a pin which is disposed and penetrates through the through hole 114 with two ends protruding from the outer peripheral wall of the driving shaft 11.

As shown in FIG. 5, in some embodiments, the outer peripheral wall of the driving shaft 11 has a plurality of recesses 114' fort the disposition of the guiding member 16. In some embodiments, the recesses 114' are located on the radially opposing sides of the outer peripheral wall of the driving shaft 11. In some embodiments, the guiding member 16 is a ball (e.g., steel ball) which can partially be accommodated in the recess 114' of the driving shaft 11 and partially protrude from the outer peripheral wall of the driving shaft 11.

In some embodiments, the inner peripheral wall of the impact bulk 13 also has recesses 131 for the disposition of the guiding member 16. In some embodiments, the recesses 131 are roughly located on the opposing sides of the inner peripheral wall of the impact bulk 13 in the radial direction. In some embodiments, the guiding member 16 is a ball (e.g., steel ball) which can be partially accommodated in the recess 131 of the impact bulk 13 and partially protrudes from the inner peripheral wall of the impact bulk 13.

In some embodiments, a plurality of rolling members 17 (e.g., balls) are disposed between the annular gasket 18 and the annular groove 134 of the impact bulk 13. In some embodiments, the plurality of rolling members 17 are preferably twenty eight balls. Referring to FIG. 2, the annular groove 134 of the impact bulk 13 extends in the longitudinal direction a distance smaller than the height of the impact bulk 13 from the outer surface of an end of the impact bulk 13. That is, the annular groove 134 does not penetrate through the impact bulk 13. Referring to FIGS. 3 and 5, in some embodiments, the outer surface of the other end of the impact bulk 13 forms an annular recessed face 132; a portion of the area of the annular recessed face 132 forms protruding blocks 133 with longitudinal cross-section having a trapezoidal shape. In some embodiments, the annular recessed face 132 has two opposing protruding blocks 133 with outer surfaces that are roughly flush with the outer surface of the impact bulk 13.

In some embodiments, the tension of the resilient member 15 is transmitted to the impact bulk 13 via the annular gasket 18 and the rolling members 17. The disposition of the rolling members 17 can allow the friction between the rotating impact bulk 13 and the annular gasket 18 to decrease to a minimum.

Figure 6:
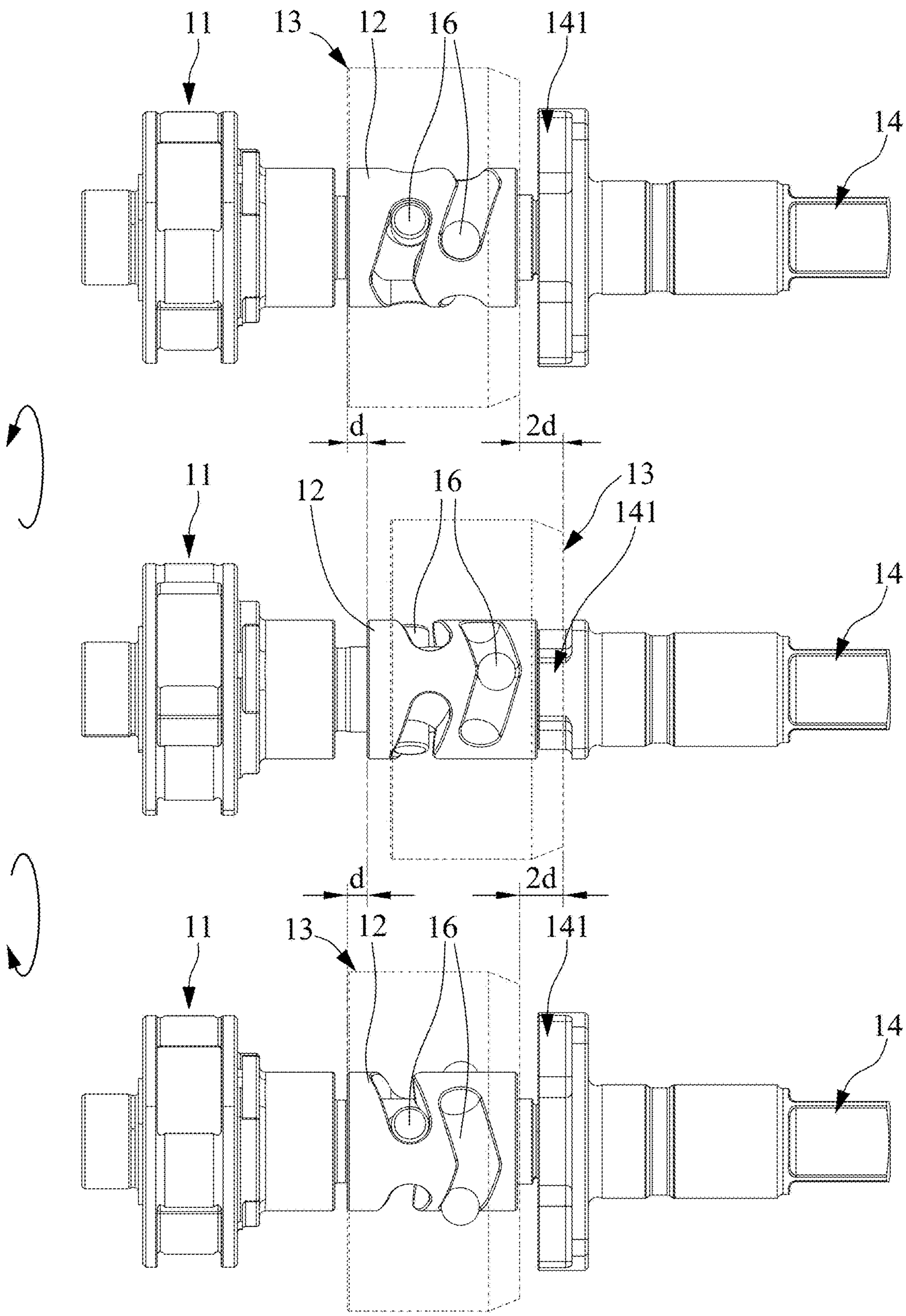
FIG. 6 depicts perspective views of the driving mechanism at different rotational angles in an embodiment of the present disclosure.

In some embodiments, the sleeve 12 has the shape of a hollow cylinder and a plurality of guiding grooves 122 for the guiding members 16 to move therein. Referring to FIGS. 3 and 5, in some embodiments, the guiding grooves 122 penetrate through the sleeve 12. In some embodiments, the guiding grooves 122 that are near the distal end 112 of the driving shaft 11 do not penetrate through the sleeve 12. In some embodiments, the guiding grooves 122 that do not penetrate through the sleeve 12 are formed on the outer peripheral wall of the sleeve 12. In some embodiments, the guiding grooves 122 of the sleeve 12 that are relatively near the proximal end 111 of the driving shaft 11 penetrate through the sleeve 12; the guiding grooves 122 of the sleeve 12 that are relatively near the distal end 112 of the driving shaft 11 do not penetrate through the sleeve 12. In some embodiments, the sleeve 12 has a pair of (two) guiding grooves 122 on one side or one end of the sleeve 12 in the longitudinal direction and also has a pair of (two) guiding grooves 122 on the other side or the other end of the sleeve 12 in the longitudinal direction, and the two guiding grooves 122 of each pair of the guiding grooves 122 are located on the radially opposite side of the sleeve 12. In some embodiments, the two pairs of the guiding grooves 122 both can penetrate through the sleeve 12. In some embodiments, the two guiding grooves 122 that are relative near the distal end 112 of the driving shaft 11 are formed from the outer peripheral wall of the sleeve 12 but do not penetrate through the sleeve 12. In some embodiments, each one of the guiding grooves 122 has a roughly V shape. In some embodiments, one pair of the two pairs of the guiding grooves 122 are disposed inversely with respect to the shape of the other pair of the guiding grooves 122. That is, the guiding grooves 122 that are near the proximal end 111 of the driving shaft 11 have a V shape, the guiding grooves 122 that are near the distal end 112 of the driving shaft 11 have an inverse V shape. In some embodiments, the guiding grooves 122 each has a distance d from the proximal end to the distal end in the longitudinal direction. Referring to FIG. 6, in some embodiments, the V-shaped guiding grooves 122 have a specific distance from the proximal end to the distal end in the longitudinal direction, such that in the course where the guiding member 16 moves from the very bottom end to the very top end of the V shape of the guiding groove 122, the guiding member 16 moves a distance d in the longitudinal direction (i.e., the axial direction).

Referring to FIG. 5, in some embodiments, the guiding member 16 is a ball and is partially accommodated in the recess 114' of the outer peripheral wall of the driving shaft 11 and partially protrudes out of the outer peripheral wall of the driving shaft 11. The portion of guiding member 16 that protrudes out of the outer peripheral wall of the driving shaft 11 can move in the guiding groove 122 of the sleeve 12. In some embodiments, the guiding member 16 in the recess 114' of the outer peripheral wall of the driving shaft 11 is constrained by the recess 114' and thus has no linear movement relative to the driving shaft 11. Therefore, the force or torque applied to the driving shaft 11 can be transmitted to the sleeve 12 via the guiding member 16 and vice versa.

Referring to FIGS. 1 and 3, in some embodiments, when the driving shaft 11 has the through hole 114, the guiding member 16 is a pin and is disposed in the through hole 114, and the two ends of the pin protrude outwardly from the outer peripheral wall of the driving shaft 11. The protruding portions of the pin can move in the guiding grooves 122 of the sleeve 12 but the pin has no linear movement relative to the driving shaft 11. Utilizing the pin as the guiding member 16 can enhance structural strength between the guiding member 16 and the driving shaft 11 and thereby ensure that the large force or torque applied to the driving shaft 11 can be effectively transmitted to the sleeve 12 via the pin.

Referring to FIGS. 3 and 5, in some embodiments, the guiding member 16 is a ball and is partially accommodated in the recess 131 of the inner peripheral wall of the impact bulk 13, and the portion of the guiding member 16 that protrudes out of the inner peripheral wall of the impact bulk 13 can move in the guiding groove 122 of the sleeve 12. In some embodiments, the guiding member 16 in the recess 131 of the inner peripheral wall of the impact bulk 13 is constrained by the recess 131 and thus has no linear movement relative to the impact bulk 13. Therefore, the force or torque applied to the impact bulk 13 can be transmitted to the sleeve 12 via the guiding member 16 and vice versa.

According to the above, the transmission of the force and torque between the driving shaft 11 and the impact bulk 13 is achieved by means of the sleeve 12 and the guiding members 16. Specifically, because the guiding member 16 disposed on the driving shaft 11 has no linear movement relative to the driving shaft 11 and because the guiding member 16 disposed on the impact bulk 13 has no linear movement relative to the impact bulk 13, the movement of the driving shaft 11 and the impact bulk 13 can be controlled by means of the movement of the guiding members 16 in the guiding grooves 122 of the sleeve 12, so that the objective of transmitting force and energy can be achieved. In addition, referring to FIG. 6, with the design of the shape of the guiding grooves 122, the torque input into the driving shaft 11 can be transferred to an axial force that can causes the sleeve 12 and the impact bulk 13 to move forward or backward.

In some embodiments, the driving shaft of the driving mechanism 11 is an input mechanism which provides an input end and rotates by the power provided by a motor. In an embodiment, the impact bulk 13 roughly has the shape of a hollow cylinder and has an annular recessed face 132 at one end. In an embodiment, the output shaft 14 abuts against the annular recessed face 132 of the impact bulk 13. Referring to FIGS. 3 and 5, in an embodiment, the end of the output shaft 14 that abuts against the driving shaft 11 has a protruding block 141 which roughly has the shape of a cuboid and abuts against the annular recessed face 132 of the impact bulk 13 and has a circular notch 142 in the middle of the protruding block 141 for being sleeved on the driving shaft 11.

Figure 7:
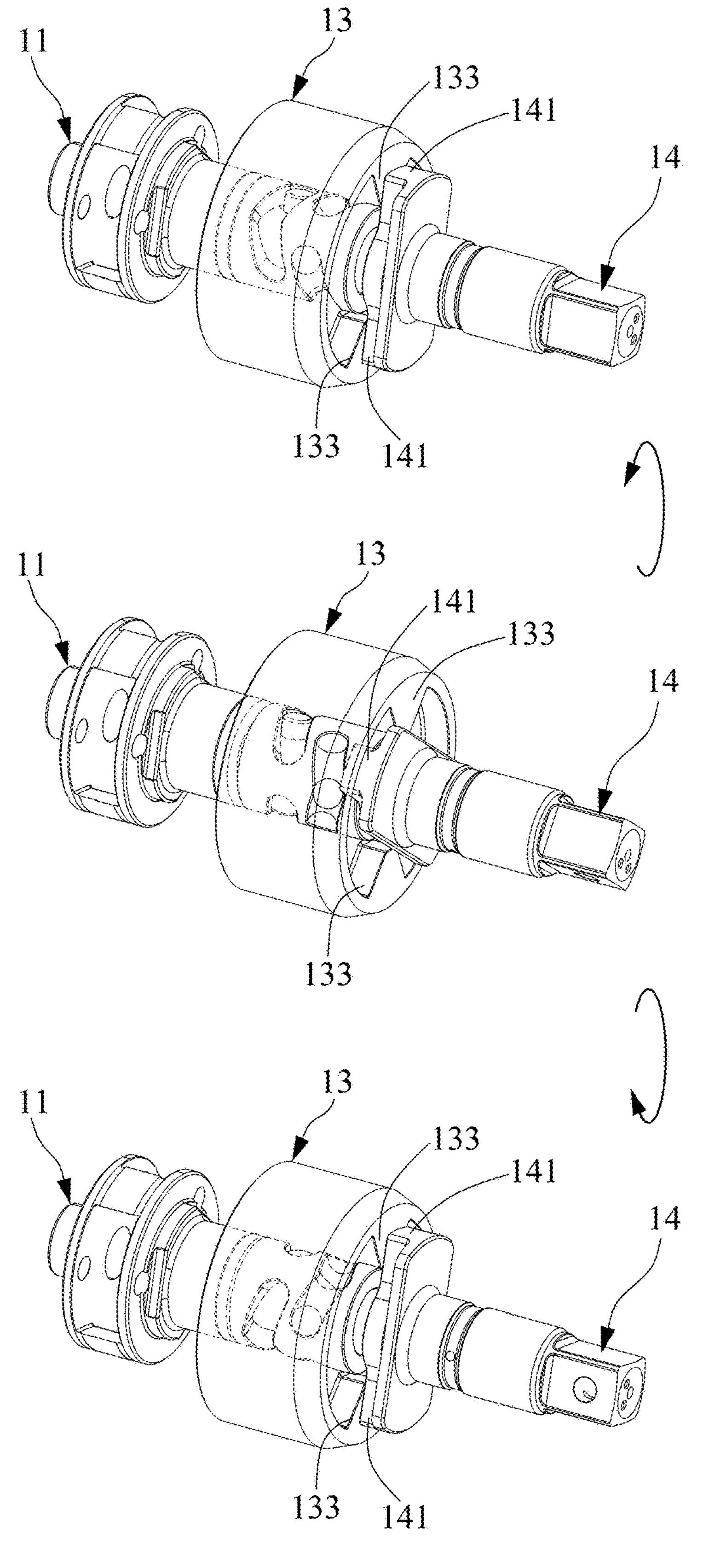
FIG. 7 depicts perspective views of the corresponding perspective views of the driving mechanism in FIG. 6.

Referring to FIGS. 6 and 7, the middle figure thereof illustrates the driving mechanism 1 in the fully-extended state wherein the guiding members 16 are located at the axially furthest position of the two pairs of the guiding grooves 122. When in use, the driving mechanism 1 rotates clockwise or counterclockwise according to the needs of fixing, tightening, or loosing during working, so that the sleeve 12 causes the impact bulk 13 to move in the axial direction (backward or forward) by means of the guiding grooves 122 and the guiding members 16. Referring to the exemplary figure of the driving mechanism 1 at the top of FIGS. 6 and 7, at the instant the impact bulk 13 moves backward toward a user, the protruding block 141 of the output shaft 14 (which is still rotating) will move from the annular recessed face 132 of the impact bulk 13 to the top of the protruding blocks 133 of the impact bulk 13. At that time, the retracted impact bulk 13 will compress the resilient member 15 and causes it to generate a tension between the driving shaft 11 and the impact bulk 13, and such tension pushes the impact bulk 13 towards the output shaft 14. Now, the output shaft 14 continues rotating relative to the impact bulk 13. When the protruding block 133 of the impact bulk 13 further rotates and exceeds the outer surface of the protruding block 141 of the output shaft 14 it abuts, the tension of the resilient member 15 pushes the impact bulk 13 forward to cause the protruding block 141 of the output shaft 14 to return to the annular recessed face 132 of the impact bulk 13.

The force-torque transfer mechanism of the present disclosure is elaborated in the following. In the above-mentioned process, the driving shaft 11 transmits rotational kinetic energy to the sleeve 12 via the guiding members 16 disposed thereon. The movement trajectory of the guiding member 16 can be constrained by means of the design of the V-shaped guiding groove 122, such that the sleeve moves in the axial direction and rotates simultaneously. The movement of the sleeve 12 further transmits the kinetic energy to the guiding members 16 disposed on the impact bulk 13 and thereby causes the impact bulk 13 to move in the axial direction and rotate. At the instant the tension of the resilient member 15 pushes the impact bulk 13 forward to cause the protruding block 141 of the output shaft 14 to return to the annular recessed face 132 of the impact bulk 13, the guiding member 16 corresponding to the impact bulk 13 can transfer the axial tension exerted on the impact bulk 13 to a torque due to the design of the shape of the guiding grooves 16 of the sleeve 12, such torque causes the side face of the protruding blocks to impact the side face of the protruding block 141 of the output shaft 14 and thereby transmits the torque to the output shaft 14. The entire movement process mentioned above repeats as the driving shaft 11 rotates constantly, such that in the process where the driving shaft 14 works (e.g., screwing a screw in or out), it applies an impact torque to the screw repetitively and thereby achieves a labor-saving effect Following further describes the detailed movement of the guiding grooves 122 of the sleeve 12 and the guiding members 16 in the operation of the driving mechanism 1 of the present invention. The exemplary view of the driving mechanism 1 in the middle of FIGS. 6 and 7 shows the sleeve 12 that is fully extended with respect to the driving shaft 11. With reference to the exemplary views of the driving mechanism 1 in the middle and at the bottom of FIGS. 6 and 7, when the driving shaft 11 rotates clockwise (from the viewpoint of a user), the guiding member 16 near the proximal end 111 will approach the right end of the guiding groove 122 from the lowest position of the V-shaped guiding groove (i.e., the middle of the V shape), such that the sleeve 12 will rotate and move backward toward the user by a distance d. At that time, the retracted sleeve 12 will cause the guiding members 16 in the other pair of the reversed-V-shaped guiding groove 122 near the distal end 112 to simultaneously approach toward the right end of the corresponding guiding groove 122, such that the impact bulk 13 will move backward toward the user by an additional distance d. Therefore, in the above process, the impact bulk 13 moves a total distance 2*d* toward the user (move backward) in the axial direction.

With reference to the exemplary views of the driving mechanism 1 in the middle and on the top of FIGS. 6 and 7, similarly, when the driving shaft 11 rotates counterclockwise (from the viewpoint of the user), the guiding member 16 will approach toward the left end of the guiding groove 122 from the lowest position of the V-shaped guiding groove (the middle of V shape), such that the sleeve 12 will rotate and move backward toward the user by a distance d. At that time, the retracted sleeve 12 will cause the guiding members 16 in the other pair of the reversed-V-shaped guiding groove 122 to simultaneously approach toward the left end of the corresponding guiding groove 122, such that the impact bulk 13 will move backward toward the user by an additional distance d. Therefore, in the above process, the impact bulk 13 moves a total distance 2*d* toward the user (move backward).

When the impact bulk 13 moves backward, the protruding block 141 of the output shaft 14 will move from the annular recessed face 132 of the impact bulk 13 to the outer surface of the protruding blocks 133 and causes the resilient member 15 to generate a tension that pushes the impact bulk 13 toward the output shaft 14. When the impact bulk 13 rotates further such that the protruding block 133 rotates over the protruding block 141 of the output shaft 14 in the circumferential direction, the tension of the resilient member 15 pushes the impact bulk 13 toward the output shaft 14 so that the impact bulk 13 moves forward and causes the protruding block 141 of the output shaft 14 return to the annular recessed face 132 of the impact bulk 13. When the impact bulk 13 is pushed forward by the tension of the resilient member 15, the guiding members 16 disposed thereon cause the impact bulk 13 to rotate at the same time due to the design of the guiding grooves 122, such that the tension in the axial direction is transferred to a torque applied to the impact bulk 13. The protruding blocks 133 of the rotating impact bulk 13 further impact the protruding block 141 of the output shaft 14 to transfer the torque to the output shaft 14.

In comparison to the guiding groove formed on the outer peripheral wall of the driving shaft 11 and the inner peripheral wall of the impact bulk 13, the sleeve 12 having the guiding groove 122 in the present invention can reduce the resistance to the movement of the guiding members 16 and can enhance the efficiency of transmission of kinetic energy (i.e., the power consumption of the tool used can be saved). In addition, because the guiding grooves 122 of the present invention are formed on the sleeve 12, high-precision manufacturing process of forming guiding grooves on the outer peripheral wall of the driving shaft 11 and the inner peripheral wall of the impact bulk 13 can be avoided. Also, the present invention can satisfy different usage demands by replacing sleeves 12 with different design of guiding grooves 122. Furthermore, the sleeve 12 of the present invention can increase the times (frequency) the impact bulk 13 impacts the output shaft 14 and reduce the operation travel of the driving mechanism 1.

The terminologies "approximately," "substantially," "basically" and "about" recited in the context are used to describe a small change. They may refer to the exact situation of an event or condition or very similar situation of an event or condition when used with events or conditions.

Singular term "a/an" and "the" recited in the context may include a plurality of article designated unless otherwise is clearly defined. In some description of embodiments, an assembly disposed "on" or "above" another assembly may cover the situation where the former assembly is directly located on (e.g., physically contact) the latter assembly and the situation where one or more interfering assemblies are located between the former assembly and the latter assembly.

Though the present disclosure is described and elaborated with reference to the particular embodiments, these descriptions and explanations do not form a limitation on the present disclosure. A person familiar with the technique of the present disclosure can clearly understand that various modification can be made without departing from the spirit and scope of the present disclosure defined in the claims attached, and replacement with equivalent assemblies are possible in the embodiments. The drawings may not be depicted according to the actual scale and proportion. Due to variants in the manufacturing process and so on, there may be difference between the art in the present disclosure and practical apparatus. There may exist other embodiments of the present disclosure that are not explicitly disclosed. The specification and drawings should be considered explanatory rather than as a limitation. Modification can be implemented in order to make practical condition, material, substance composition, method or process comply with the objective, spirit and scope of the present disclosure. All modifications of this kind are within the scope of the claims as attached. Although the method disclosed in the contents are describe with specific operation that are implemented in a specific order, it can be understood that an equivalent method can be formed by combining, dividing or rearranging the operation without departing from the teaching of the present disclosure. Therefore, the order and classification of the operation do not form a limitation on the present disclosure unless otherwise specify in the contents.

What is claimed is:

1. A driving mechanism, comprising:

a driving shaft defining an axial direction;

a sleeve sleeved on the driving shaft and having a first guiding groove and a second guiding groove;

an impact bulk sleeved on the sleeve;

a first guiding member being movable in the first guiding groove and being configured to have no linear movement relative to the driving shaft;

a second guiding member being movable in the second guiding groove and being configured to have no linear movement relative to the impact bulk; and wherein the first guiding groove and the second guiding groove being configured such that when the first guiding member is moving in the first guiding groove and the second guiding member is moving in the second guiding groove, the sleeve moves in the axial direction relative to the driving shaft and the impact bulk;

wherein the driving mechanism further comprises a resilient member configured to apply a tension to the impact bulk relative to the driving shaft in the axial direction and an output shaft disposed on a side of the driving mechanism opposite to the driving shaft;

wherein the first guiding groove and the second guiding groove are spaced apart in the axial direction of the sleeve and are spaced apart by an angle in the radial direction of the sleeve; and wherein the first guiding groove is closer to the driving shaft in the axial direction than the second guiding groove and the first guiding groove passes through the sleeve;

wherein the sleeve additionally has a third guiding groove and a fourth guiding groove, and the third guiding groove is located on the opposite side of the first guiding groove and the fourth guiding groove is located on the opposite side of the second guiding groove; and wherein the driving mechanism further comprises a third guiding member configured to have no linear movement relative to the driving shaft but to move in the third guiding groove and a fourth guiding member configured to have no linear movement relative to the impact bulk but to move in the fourth guiding groove; and wherein the first guiding member and the third guiding member are a ball.

2. The driving mechanism according to claim 1, wherein the driving shaft has two recesses for accommodating the first guiding member and the third guiding member, and the impact bulk has two recesses for accommodating the second guiding member and the fourth guiding member.

3. The driving mechanism according to claim 2, wherein the second guiding member and the fourth guiding member are a ball.

* * * * *